April 27, 1954  H. B. BABSON ET AL  2,676,743
APPARATUS AND METHOD FOR FILLING MILK CONTAINERS
Filed April 28, 1951  6 Sheets-Sheet 1

Inventors:
Henry B. Babson,
Chester A. Thomas,
By Schroeder, Merriam,
Hofgren, Brady, Attys.

April 27, 1954  H. B. BABSON ET AL  2,676,743
APPARATUS AND METHOD FOR FILLING MILK CONTAINERS
Filed April 28, 1951  6 Sheets-Sheet 2
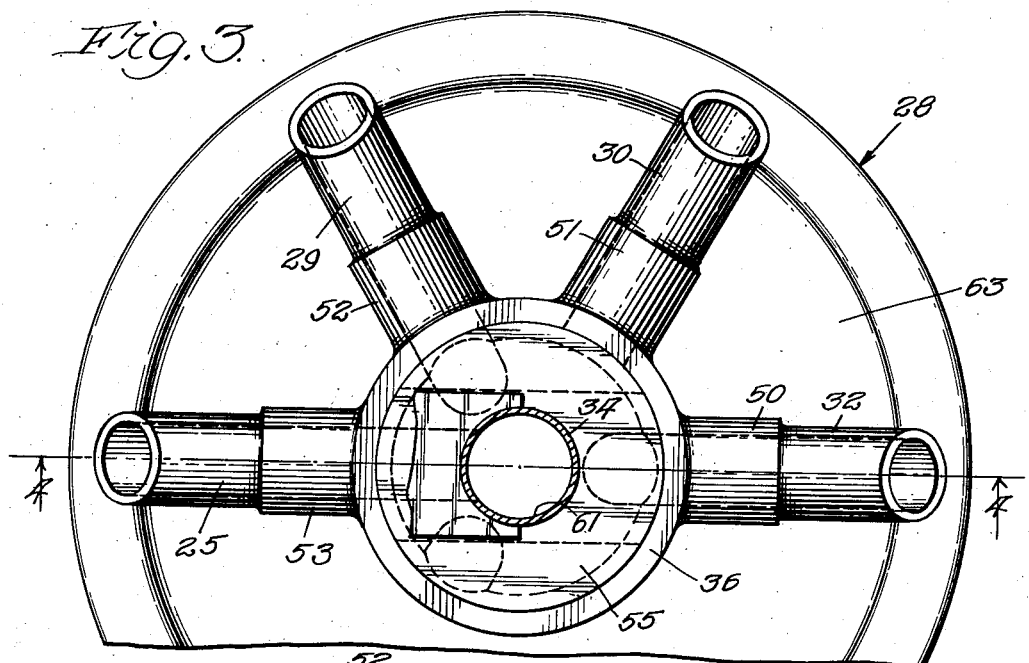

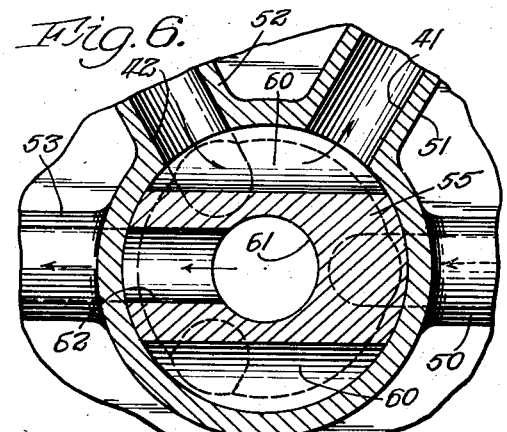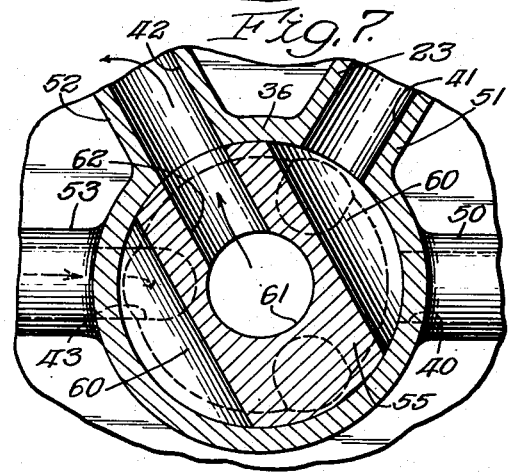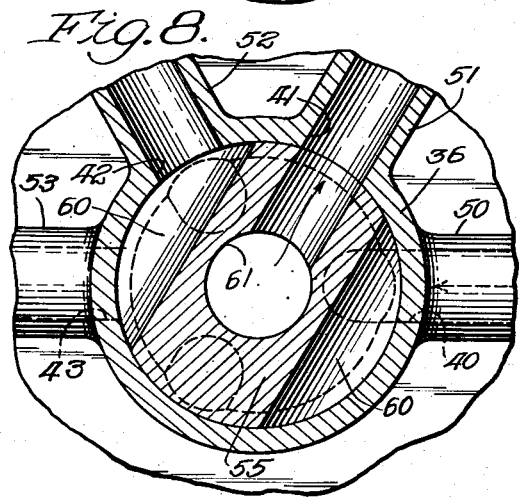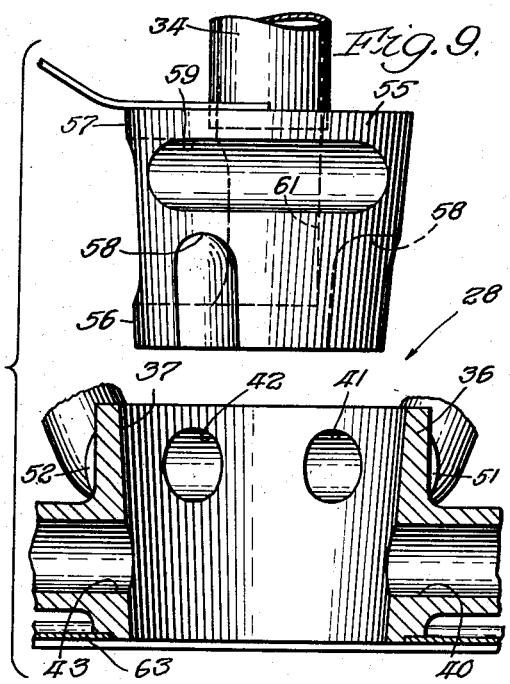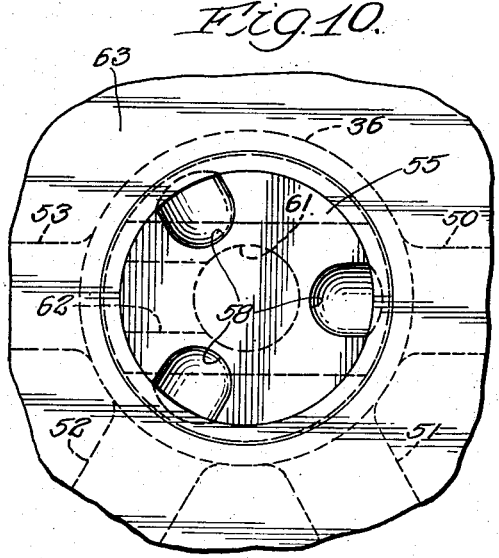

April 27, 1954 H. B. BABSON ET AL 2,676,743
APPARATUS AND METHOD FOR FILLING MILK CONTAINERS
Filed April 28, 1951 6 Sheets-Sheet 4
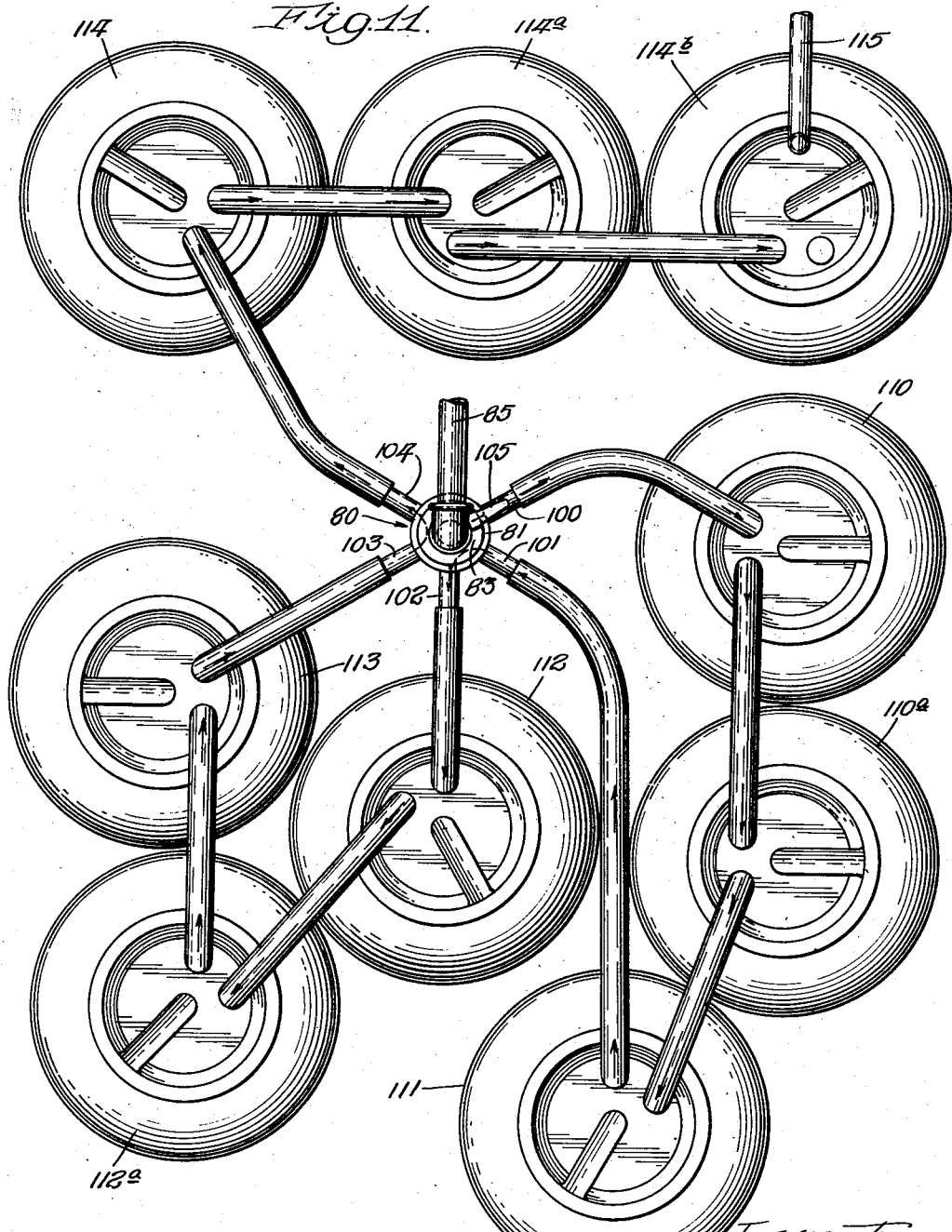

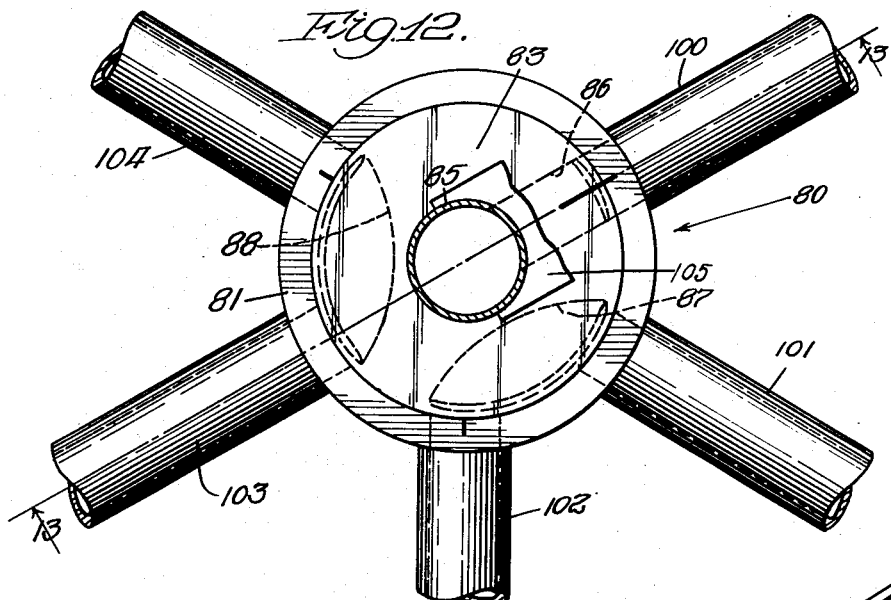
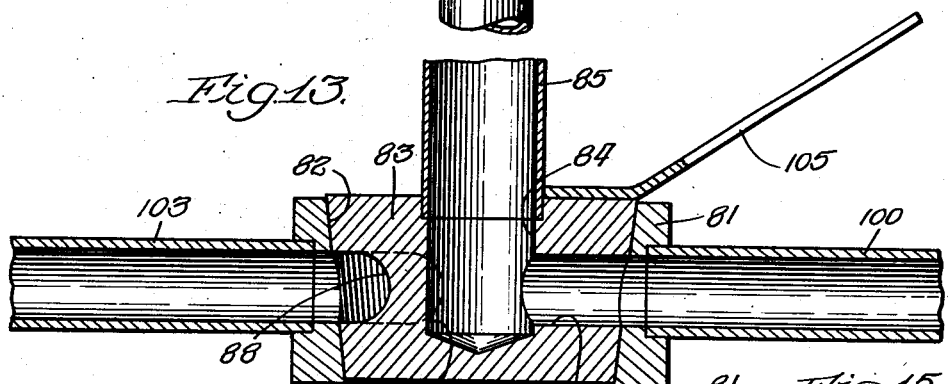
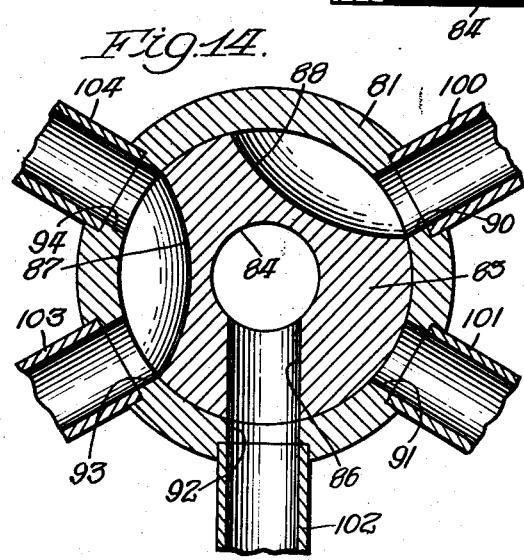
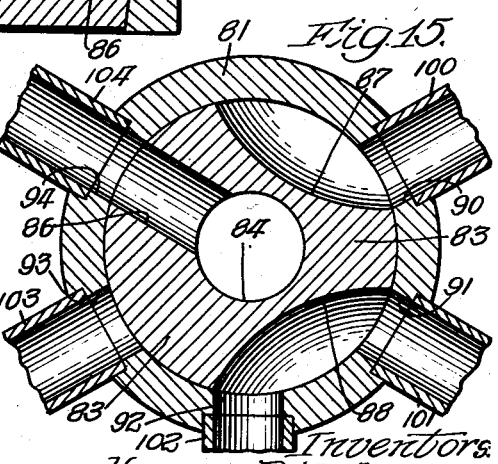

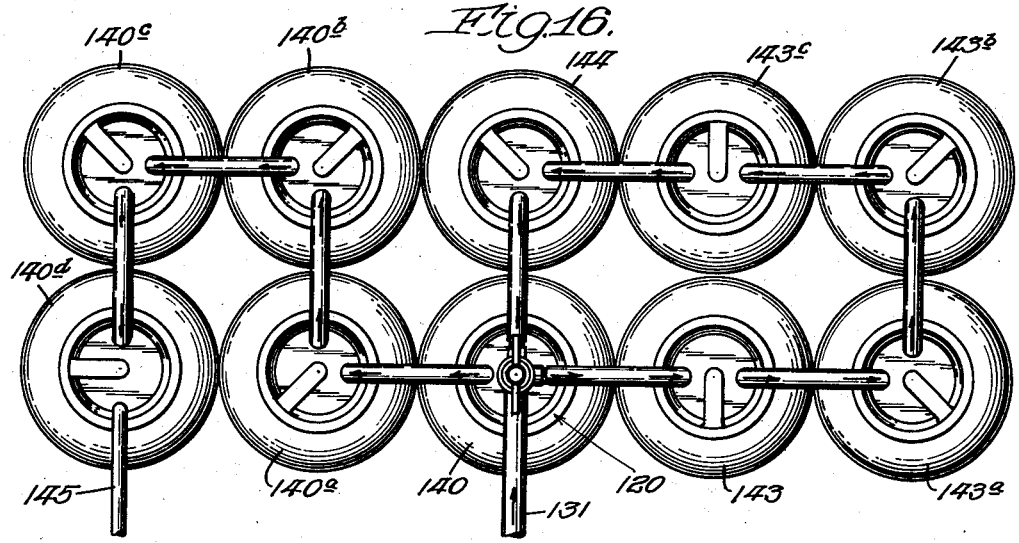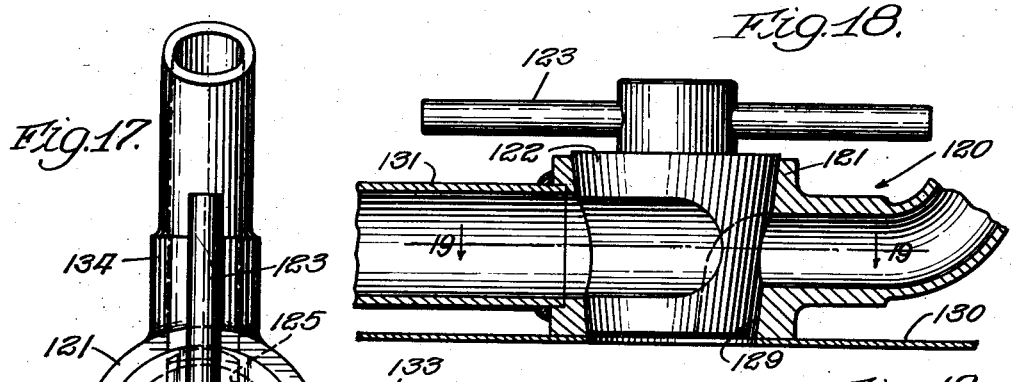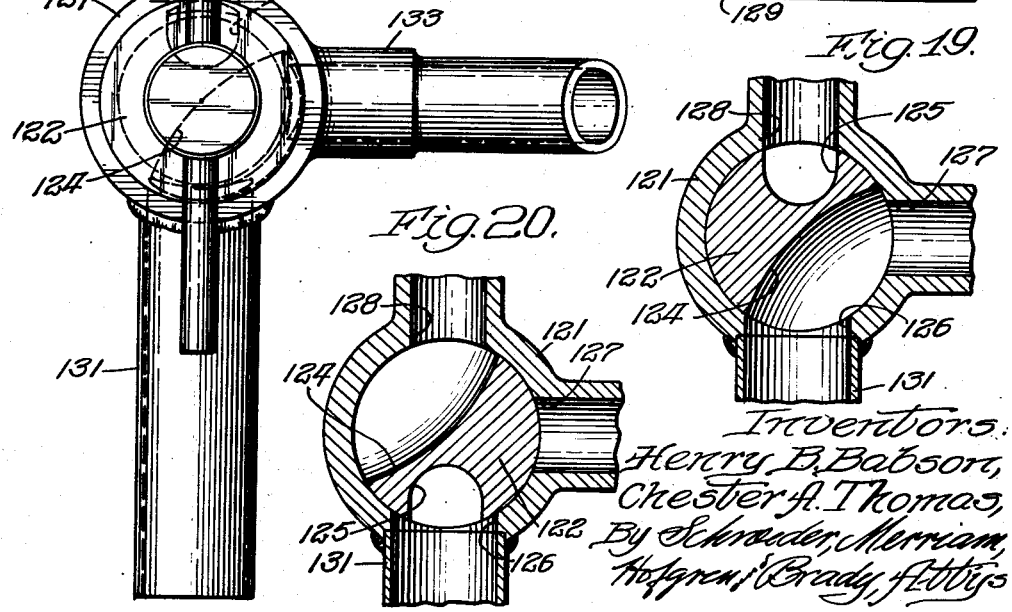

Patented Apr. 27, 1954

2,676,743

UNITED STATES PATENT OFFICE 2,676,743

APPARATUS AND METHOD FOR FILLING MILK CONTAINERS

Henry B. Babson, Chicago, and Chester A. Thomas, Lake Forest, Ill., assignors to Babson Bros. Co., a corporation of Illinois Application April 28, 1951, Serial No. 223,608

11 Claims. (Cl. 226—116)

This invention relates to a milk distribution system and more particularly to an apparatus and method for filling milk containers. It is particularly adapted for use in conjunction with the machine milking of cows where the milk is passed into a common pipe to be directed into a plurality of containers.

One feature of this invention is that it provides a method for filling a series of milk containers with very little attention on the part of an operator. Another feature of the invention is that it provides means whereby an operator can fill milk cans, divert the flow of milk to other cans, replace the filled cans with empty cans and repeat this process as long as milk is available in the pipe line. A further feature of the invention is that it provides a means for filling a number of cans without having an operator stand by to prevent overflowing of each can after it has been filled. A further feature of the invention is that it enables milk containers to be filled with milk without exposing the milk to contamination from the atmosphere during the filling operation. Another feature of the invention is that it provides a distribution system including a valve, the operation of which enables an operator to choose the sequence of filling of a number of containers in fluid communication with each other. Another feature of the invention is that it provides means for connecting a number of milk containers together to maintain a continuous passageway through the containers.

Other features and advantages of this invention will be apparent from the following specification and drawings, in which:

Fig. 3 is an enlarged plan view, partially broken and partially in section, of the distribution valve used in the embodiment illustrated in Fig. 1;

Fig. 4 is a vertical sectional view of the distribution valve shown in Fig. 3 taken along the line 4—4 of Fig. 3;

Fig. 5 is a sectional view of the distribution valve taken along the line 5—5 of Fig. 4;

Fig. 6 is a sectional view of the distribution valve taken along the line 6—6 of Fig. 4;

Fig. 7 is a view similar to Fig. 6 except with the valve turned to a different setting;

Fig. 8 is a view similar to Figs. 6 and 7 except that the valve is at still another setting;

Fig. 9 is an exploded view, partially in section, showing the two portions of the distribution valve;

Fig. 10 is a bottom plan view of the valve as it would appear looking up from the bottom of the exploded view shown in Fig. 9;

Fig. 11 is like Fig. 1 but illustrating another embodiment of this invention;

Fig. 12 is a top plan view of the distribution valve used in Fig. 11;

Fig. 13 is a vertical sectional view of the distribution valve taken along the line 13—13 of Fig. 12;

Fig. 14 shows one setting of the valve illustrated in Fig. 12;

Fig. 15 shows another setting of the valve of Fig. 12;

Fig. 16 is like Fig. 1 but illustrating a third embodiment of the invention;

Fig. 17 shows the distribution valve illustrated in the embodiment of Fig. 16;

Fig. 18 is a sectional elevation of the distribution valve employed in the apparatus illustrated in Fig. 16;

Fig. 19 is a top sectional view taken along the line 19—19 of Fig. 18 showing one setting of the distribution valve illustrated in Fig. 16; and Fig. 20 illustrates another setting of the distribution valve illustrated in Fig. 16.

Figure 1:
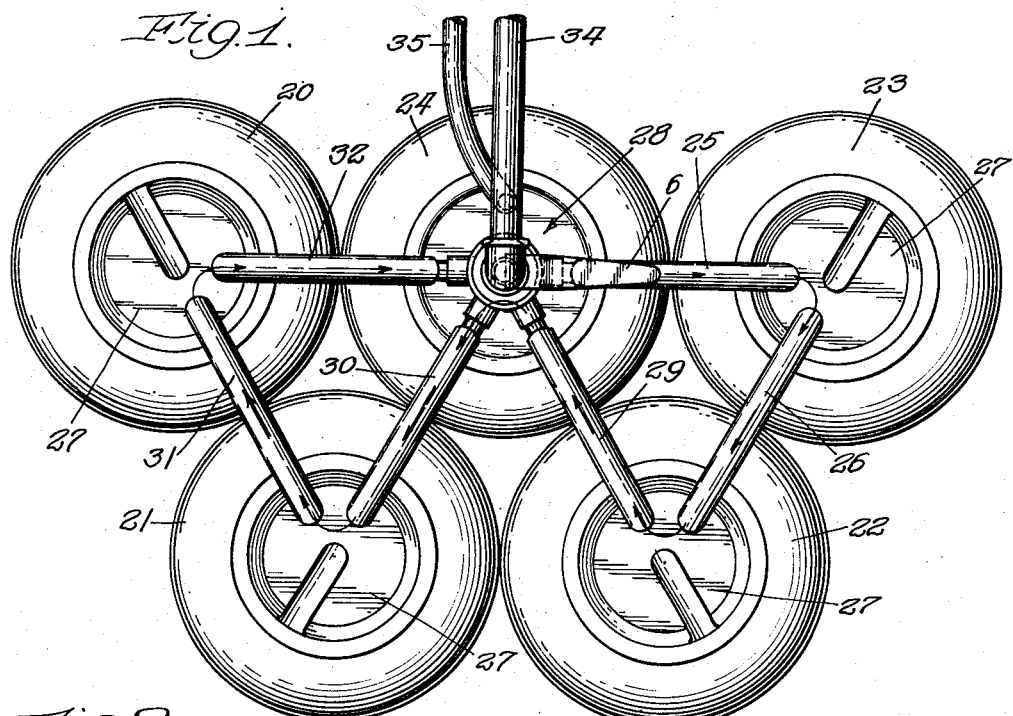
Fig. 1 is a plan view of a number of milk containers linked together in accordance with one embodiment of this invention.

While this invention is susceptible of embodiment in many different forms, there are shown in the drawings and will herein be described in detail three specific embodiments, with the understanding that the present disclosure is to be considered as an exemplification of the principles of the invention and is not intended to limit the invention to the embodiments illustrated. The scope of the invention will be pointed out in the appended claims.

In some of the dairies utilizing the latest developments in the machine milking field, milk is run from a cow directly to a pipe and from there to a final container or can. In a large dairy the milk flows through the pipe in a fairly constant stream of considerable magnitude and, consequently, it is highly desirable to provide some means which will avoid having an attendant stand by while waiting for the containers to be filled. In accordance with this invention, a number of containers connected together in series by easily removable fluid passages may be filled in serial order or in select groups without necessitating the constant attendance of an operator and without spilling any of the milk. This is accomplished by arranging a number of milk containers in series having fluid passages linking them together to form a single continuous fluid system. A distribution valve controls one end of such a system and the system is doubled-back so that the valve may again control the system at some point between the two ends thereof, and thus the valve may subdivide the system into groups which may be filled as separate units of the system. The valve is arranged to control the flow of milk through the system so that a group of containers which have been filled may be disconnected from the rest of the system and replaced by empty containers which may then be valved back into the system.

Figure 2:
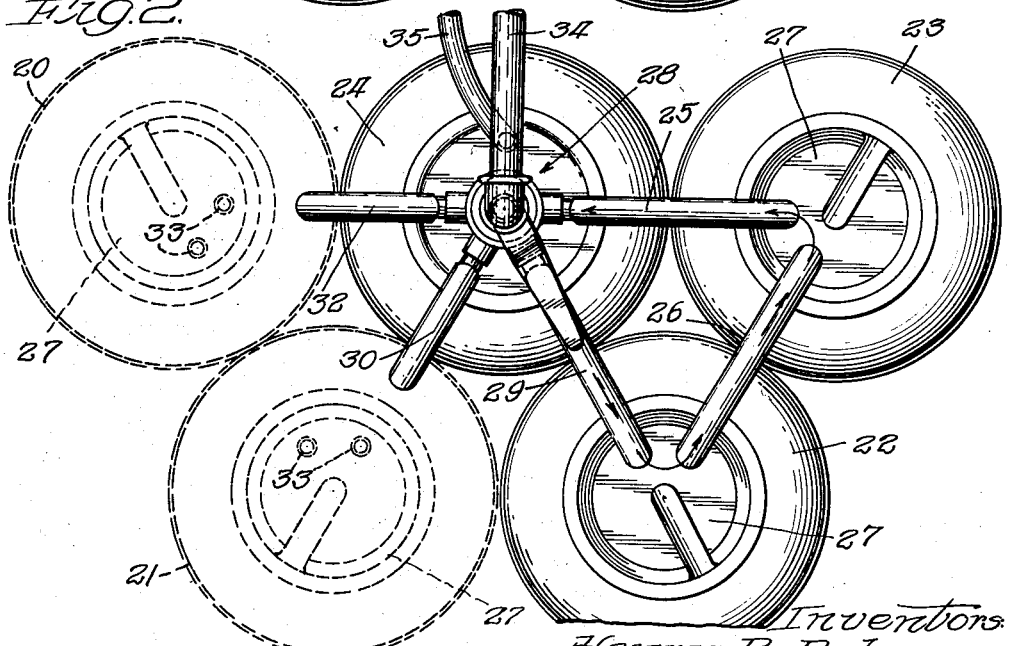
Fig. 2 is a view similar to Fig. 1 showing the valve in a different position so that two of the containers which have been filled may be removed without interrupting the filling process.

Referring now to Fig. 1 of the drawings, there are shown a number of containers 20, 21, 22, 23 and 24 which are connected together in series. To this end the container 23 is connected to the container 22 by means of a fluid passage which, in the embodiment illustrated, may take the form of a strip of molded plastic tubing 26 having each end inserted through an opening in the lid 27 provided on each container. The container 22 is connected to a central distribution valve 28 by a second fluid passage 29, the valve serving to connect the passage 29 with another passage 30 having its other end connected through an opening in the lid 27 of the container 21. The container 21 in turn is connected by means of the tubing 31 to the container 20 in a manner similar to the previously described connections and the container 20 is connected by passage or tubing 32 to the distribution valve 28, which is also connected to the container 23 by the passage 25. The containers may readily be introduced into the system for, as can be seen in Fig. 2, each of the lids 27 is provided with two apertures 33 into which the ends of the tubing may readily be inserted to provide air-tight connection between the tube and the interior of the container. A common supply pipe 34 is provided for delivering milk to the distribution valve 28 for distribution throughout the series of containers, and the last container in the series, which in this particular embodiment is the container 24, is connected to a vacuum line 35 through an aperture in its lid.

The distribution valve 28 is best illustrated in Figs. 3, 4, 5 and 9 and includes a valve body 36 having a frusto-conical bore 37 therein with a number of ports extending through the body and opening into the bore. As will be noted from Fig. 9, two ports 40 and 43 are located at diametrically opposite positions in the lower portion of the bore 37 and two additional ports 41 and 42 are angularly displaced from the first mentioned ports and are located near the upper portion of the bore. The ports 40 to 43 inclusive connect with individual short pipe sections 50 to 53, with the pipe sections being connected to the containers 20 to 23 inclusive as previously described.

Rotatable in the bore 37 is a valve core member 55 having a lower circular portion 56 adapted to make fluid-tight contact with the lower portion of the bore and an upper cylindrical portion 57 to make fluid-tight contact with the upper portion of the bore. The valve core is provided at its bottom with three cutaway portions forming fluid passageways 58 which extend upwardly only a part of the way towards the top of the core. Opposite sides of the core are formed with dished out portions 59 to provide fluid passageways indicated at 60 extending parallelly on either side of the core and between the sealing portions 56 and 57 thereof.

The supply pipe 34 connects with a passage 61 extending axially through the bore and communicating with another cutout portion 62 providing a passageway extending parallel to the passageways 60 but separated therefrom by the intervening portions of the core. As will be noted from Fig. 4, the cutout portion 62 extends between the portions 56 and 57 of the core to provide a passageway elongated vertically to an extent sufficient to communicate either with the upper ports 41 and 42 or with the lower ports 40 and 43 as the valve core is rotated.

As seen in Figs. 3 and 4, it will be noted that the body 36 of the valve 28 is fixed to a lid 63 which is adapted to be secured in fluid-tight relationship on the top of the container 24 and which may be readily removed when the container is moved after it has become filled with milk. Each of the cutaway portions 58 open through the bottom of the valve core 55 which is, in effect, a port opening into the container 24.

The operation of this particular embodiment of the invention is as follows. With the valve set in the position shown in Figs. 1 and 6, milk delivered through the supply line 34 enters the passages 61 and is directed by means of the passageway 62 into the pipe 53 and hence into the tubing 25 and container 23. When container 23 is completely filled milk passes through the container, tubing 26 and into the container 22. When this latter container is filled, milk passes through the passage 29 into the distribution valve 28 and through the port 42, through passageway 60 and out through port 41 into the container 21. When the container 21 is filled, milk is delivered through the passage 31 into the container 20 and when that container is filled it is delivered into the passageway 58 which is then aligned with the port 40 and thence into the final container 24. Thus with the valve so set no attention is needed by an operator until sufficient milk has been introduced into the system to fill all five containers.

Should it be desired to use no more than five containers under conditions where more than enough milk to fill the five containers is expected to be delivered, the operation may be modified by shifting the valve by means of its handle to the position shown in Figs. 2 and 7. In this position milk entering the passage 61 is delivered through the port 42 into the container 22. When this container is filled, milk is delivered to the container 23 and thence back into the distribution valve through the port 43 which connects with the passageway 58 and hence with central container 24. Containers 20 and 21 which may have been previously filled are removed from the system for emptying or to be replaced by other containers after lifting out the tubes which connect them in the system. When the containers 22 and 23 are completely filled, which will become evident when milk is seen flowing through the transparent plastic tubing 25 into the central container 24, the containers 20 and 21 can be hooked back into the series and the valve shifted to the position shown in Fig. 8. With the valve in this position, milk is delivered to the empty containers 20 and 21 and cut off from the containers 22 and 23. These latter containers may then be removed and replaced by empty containers.

In this form of operation which provides for a continuous source of milk and continually fills containers so that they may be replaced without interrupting the operation, the central container acts as an overflow reservoir. Thus should there be delay in emptying and replacing the containers to the extent that the containers in service become completely filled the excess is led into the container 24 which gives the operator some excess time in order to hook up the new empty containers and shift the valve. At the end of the operation the milk in the container 24 is, of course, used and none is wasted.

A modified form of the invention is shown in Figs. 11 to 15 inclusive and includes a distribution valve 80 including a valve casing 81 having a conical frusto bore 82 with a conical valve core 83 rotatable therein. The valve core is provided with a central passage 84 to which the supply pipe 85 is connected, the passage 84 opening into a laterally extending passageway 86 which opens to the side of the bore member. The core is also provided with two moon-shaped connecting passageways 87 and 88 which have a length sufficient to connect together certain of the ports in the valve casing as the valve core is rotated. Five ports 90 to 94 are provided in the valve casing each connected to a nipple 100 to 104. Means in the form of a handle 105 are provided for rotating the valve to position the various passages with respect to the ports to distribute the milk amongst a plurality of containers.

As shown in Fig. 11 nine such containers are shown, each of which is to be filled by milk passing through the distribution valve 80. As will be noted from that figure, the supply line 100 is connected to a container 110, the line 101 is connected to the container 111, the line 102 is connected to the container 112, 103 is connected to container 113 and line 104 to container 114 by the lines indicated. The container 110 is connected to a second container 110a which is in turn connected to the container 111. The container 112 is connected to the container 112a which connects to the container 113. The container 114 connects to container 114a which is connected to container 114b to which a vacuum line 115 is connected. The connections used may be the flexible plastic tubing previously described which is inserted through appropriate openings in the lid of each container, it being felt that the construction of such tubing and lids has been sufficiently previously described and need not be again described here.

With the valve in the position shown in Fig. 12, milk coming through the supply line is directed into the passageway 86 and passage 100 to container 110. Milk fills the containers 110, 110a, 111 and returns to the distribution valve through the passage 101. Upon reaching the valve the milk passes through the moon-shaped passageway 87 into the passage 102 to fill the containers 112, 112a and 113.

If it is desired to fill all the containers at one time the valve may be left in the position of Fig. 12 whereupon after filling container 113 milk passes through the passage 103, port 93, passageway 88, port 94, passage 104 and into container 114 to fill that container and then to fill containers 114a and 114b.

Inasmuch as the usual dairy installation and equipment are designed to move the milk from the cow to the container through the use of vacuum applied to the container, it is obviously undesirable at any time during the actual milking operation to shut off the vacuum. It is preferable, therefore, to use the system herein disclosed as a continuous system by replacing filled containers without shutting off the delivery. Thus, when the milk begins to flow into the container 112 the valve may be shifted to the position shown in Fig. 14 which directs milk into the balance of the containers but cuts off containers 110, 110a and 111 so that they may be emptied or removed and replaced by others. Furthermore, if it is desired to fill more than three containers before shifting the valve, the valve may be left in the position shown in Fig. 12 until all the containers except 114, 114a and 114b are filled whereupon the valve may be shifted to the position shown in Fig. 15 which directs milk only into the last three named containers so that the others may be removed and emptied.

Another form of the invention is shown in Figs. 16 to 20 inclusive and includes a simplified form of distribution valve 120 which includes a casing 121 having a core 122 rotatable therein through the medium of a handle 123. The core is provided with a moon-shaped passageway 124 and a second passageway 125 cut in the side of the bore and positioned to register with any one of the ports 126, 127 or 128 provided in the valve casing and opens through a port 129 in the bottom of the valve to connect with the container directly below the valve, it being understood that this valve is, like the first embodiment shown, mounted on a lid 130 for a container. Milk is directed into the valve through a supply line 131 which is connected to the inlet port 126. A pipe 133 is connected to the port 127 and a second pipe 134 is connected to the port 128.

As shown in Fig. 16, a number of containers can be connected in series to the distribution valve 120, there being ten such containers shown with the valve mounted on container 140 and with the pipe 133 connected to another container 143 and the pipe 134 connected to the container 144.

The container 143 is connected in series to four other containers 143a, 143b, 143c, which latter container is connected to the container 144. The container 140 is connected in series to the containers 140a, 140b, 140c and 140d, the latter container being connected to a vacuum line 145.

With the valve in the position shown in Figs. 17 and 19, all of the containers are connected in series for filling, and milk is directed through the passageway 124 from the port 126 to the port 127 to fill in sequence the containers 143a, 143b, 143c and 144. When the container 144 is filled, milk is directed through the port 128 and passageway 125 into the container 140, and when the last named container is filled the containers 140a, 140b, 140c and 140d are filled.

If it is desired to replace cans which have been filled without interrupting the flow of milk when the first five containers have been filled, the valve may be shifted to the position shown in Fig. 20 which directs milk into the container 140 through the passageway 125, the container 140 and thence into the last four containers in the series. While these containers are being filled, the first five may be removed and emptied or replaced.

It will be obvious that while specific numbers of containers are shown connected to the distribution valve in each embodiment of the invention illustrated, greater or fewer numbers of containers may be employed as the case warrants, with the added containers being connected in series to the containers illustrated so that the entire system may be enlarged or reduced in size as conditions demand.

We claim:

1. A milk distribution system comprising: a first and a second plurality of containers; a first system of fluid passages connecting the first plurality of containers together in series; a second system of fluid passages connecting the second plurality of containers together in series; means for applying vacuum to the last container in the second series; a source of milk; a distribution valve having at least three ports, the first of which is connected to the first container of the first series, the second of which is connected to the last container of the first series, and the third of which is connected to the first container of the second series, and said valve having at least two fluid passageways, the first of which is adapted to connect the source with a single port and the other of which is adapted to connect together two of said ports; a movable member controlling the passageways; and means for moving the member from a first position in which the source is connected through the first passageway to the first port with the other passageway connecting together said second and third ports, to a second position connecting the source to the third port whereby flow to the first series of containers is shut off.

2. A milk distribution system comprising: a first plurality of containers; a second plurality of containers; a common overflow container; a first system of fluid passages connecting the first plurality of containers and the common container together in series; a second system of fluid passages connecting the second plurality of containers and the common container together in series, with the common container being the lowest in each series; means for applying vacuum to the common container; a source of milk; distribution valve means having at least five ports, the first and second of which are connected to different containers in the first series, the third and fourth of which are connected to different containers in the second series, and the fifth of which is connected to the common container, and said valve means having at least three fluid passageways, the first of which is adapted to connect the source to a single port, the second of which is adapted to connect together two of said ports and the third of which is adapted to connect the fifth port with one of the other ports; a movable member controlling the passageways; and means for moving the member from a first position connecting all of the containers together in a single series in which the source is connected through the first passageway to the first port, the second and third ports are connected together through the second passageway and the fourth and fifth ports are connected together through the third passageway, to a second position connecting the source only to said first series with the source being connected through said first passageway to the second port and said first and fifth ports are connected together through the third passageway, and to a third position connecting the source only to said second series with the source being connected through said first passageway to the third port and said fourth and fifth ports are connected together through said third passageway.

3. A milk distribution system comprising: three groups of containers; a first system of fluid passages connecting the containers of the first group together in series; a second system of fluid passages connecting the containers of the second group together in series; a third system of fluid passages connecting the containers of the third group together in series; means for applying vacuum to the last container in the third series; a source of milk; a distribution valve having at least five ports, the first and second of which are connected, respectively, to the first and last containers of the first series, the third and fourth of which are connected, respectively, to the first and last containers of the second series, and the fifth of which is connected to a container in the third series, and said valve having at least three fluid passageways, the first of which is adapted to connect the source with a single port and the second and third of which are each adapted to connect together two of said ports; a movable member controlling the passageways; and means for moving the member from a first position connecting all of the containers together in a single series in which the source is connected through the first passageway to the first port with the second passageway connecting together the second and third ports and with the third passageway connecting together the fourth and fifth ports, to a second position connecting the source only to the second and third series with the source being connected through the first passageway to the third port and with the second passageway connecting together the fourth and fifth ports, and to a third position connecting the source only with the third series with the source being connected through the first passageway to the fifth port.

4. A milk distribution system comprising: a first and a second plurality of containers; a first system of fluid passages connecting the first plurality of containers together in series; a second system of fluid passages connecting the second plurality of containers together in series; means for applying vacuum to the last container in the second series; a source of milk; a distribution valve having an inlet port and at least three other ports, the first of which is connected to the first container of the first series, the second of which is connected to the last container of the first series, and the third of which is connected to the first container of the second series, and said valve having at least two fluid passageways, the first of which is adapted to connect the inlet port with a single other port and the other of which is adapted to connect together two of said other ports; a movable member controlling the passageways; and means for moving the member from a first position in which the inlet port is connected through the first passageway to the first port with the other passageway connecting together said second and third ports, to a second position connecting the inlet port to the third port whereby flow to the first series of containers is shut off.

5. A milk distribution system comprising: a first and a second plurality of containers and a common overflow container; a first system of transparent plastic tubing forming fluid passages opening through the tops of the containers to connect the containers in the first plurality together in series; a second system of transparent plastic tubing forming fluid passages opening through the tops of the containers to connect the containers in the second plurality together in series; means for applying vacuum to the common container; a source of milk; a distribution valve fixed to the top of the common container and having at least five ports, the first and second of which are connected to different containers in the first series, the third and fourth of which are connected to different containers in the second series, and the fifth of which opens through the top of the common container, and said valve having at least three fluid passageways, the first of which is adapted to connect the source to a single port, the second of which is adapted to connect together two of said ports and the third of which is adapted to connect the fifth port with one of the other ports; a movable member controlling the passageways; and means for moving the member from a first position connecting all of the containers together in a single series in which the source is connected through the first passageway to the first port, the second and third ports are connected together through the second passageway and the fourth and fifth ports are connected together through the third passageway, to a second position connecting the source only to said first series with the source being connected through said first passageway to the second port and said first and fifth ports are connected together through the third passageway, and to a third position connecting the source only to said second series with the source being connected through said first passageway to the third port and said fourth and fifth ports are connected together through said third passageway.

6. A milk distribution system for delivering milk to all or selected groups of a plurality of milk containers comprising: a first system of fluid passages for connecting a first group of the containers together in series; a second system of fluid passages for connecting a second group of the containers together in series; a distribution valve adapted to be connected to a source of milk, said valve having at least three ports, the first of which is adapted to be connected to the first container of the first series, the second of which is adapted to be connected to the last container of the first series, and the third of which is adapted to be connected to the first container of the second series, and said valve means having at least two fluid passageways, the first of which is adapted to connect the source with a single port and the other of which is adapted to connect together two of said ports; a movable member controlling the passageways; and means for moving the member from a first position in which the source is connected through the first passageway to the first port with the other passageway connecting together said second and third ports, to a second position connecting the source to the third port whereby flow to the first series of containers may be shut off.

7. A milk distribution system for distributing milk sequentially into selected groups of a plurality of containers comprising: a plurality of milk container lids each having a plurality of openings therein; a distribution valve having an inlet port adapted to be connected to a source of milk, a plurality of other ports, and means movable to control said other ports; and a plurality of lengths of transparent plastic tubing, the ends of the tubing being tapered for ready insertion into said openings and adapted to be connected in said other ports to connect each container in each group in series with the other containers in said group and to connect the groups together in series through said other ports in said distribution valve.

8. A milk distribution system for distributing milk sequentially into selected groups of a plurality of containers comprising: a plurality of milk container lids each having a plurality of openings therein; a distribution valve having an inlet port adapted to be connected to a source of milk, a plurality of other ports, and means movable to control said other ports; and a plurality of lengths of tubing, the ends of the tubing being adapted for ready insertion into said openings and to be connected to said other ports to connect each container in each group in series with the other containers in said group and to connect the groups together in series through said other ports in said distribution valve.

9. The method for sequentially filling preselected groups of containers with milk from a single source connected to milk withdrawing apparatus which comprises: connecting a first group of containers together in series; connecting a second group of containers together in series; connecting the last container in the first group and the first container in the second group together to connect the groups together in series; delivering milk from the source to a distribution point; constantly applying vacuum to the last container of the second group; directing the flow of milk from the distribution point into the first container of the first group of containers; maintaining the flow to fill all of the containers in said first group; redirecting the flow from said distribution point into the first container of the second group of containers while simultaneously breaking the connection between the groups of containers; and then replacing the filled containers in the first group with empty containers connected together in series while filling the containers in the second group.

10. The method for sequentially filling a plurality of serially connected groups of containers with milk from a single source which comprises: connecting said groups of serially connected containers in series; delivering milk from the source to a distribution point; delivering the flow of milk from the distribution point into the first container of the first group of containers; maintaining the flow to fill all of the containers in said first group; redirecting the flow from said distribution point into the first container of another group of containers while simultaneously breaking the connection with said first group of containers; and then replacing the filled containers in the first group with empty containers while filling the containers in said other group.

11. A milk distribution system for distributing milk sequentially into selected groups of a plurality of containers comprising: a plurality of milk container lids each having at least one opening therein; a distribution valve having an inlet port adapted to be connected to a source of milk, a plurality of other ports, and means movable to control said other ports; and a plurality of lengths of conduit means operably connectable with said openings and with said other ports to connect each container lid in each group in series with the other container lids in said group and to connect the groups together in series through said other ports in said distribution valve.

References Cited in the file of this patent

UNITED STATES PATENTS

| Number | Name | Date |
|---|---|---|
| 1,048,597 | Shephard | Dec. 31, 1912 |
| 1,101,574 | Shephard | June 30, 1914 |
| 1,571,080 | Wright | Jan. 26, 1926 |
| 2,009,400 | Hapgood | July 30, 1935 |
| 2,037,467 | Hapgood | Apr. 14, 1936 |
| 2,498,401 | Duncan | Feb. 21, 1950 |